United States Patent
Liang et al.

(10) Patent No.: US 10,417,532 B2
(45) Date of Patent: Sep. 17, 2019

(54) OFFLINE IDENTITY AUTHENTICATION METHOD AND APPARATUS

(71) Applicant: GRG Banking Equipment Co., Ltd., Guangzhou, Guangdong (CN)

(72) Inventors: Tiancai Liang, Guangdong (CN); Dandan Xu, Guangdong (CN); Yong Zhang, Guangdong (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 0 days.

(21) Appl. No.: 16/075,540

(22) PCT Filed: Jun. 12, 2017

(86) PCT No.: PCT/CN2017/087867
§ 371 (c)(1),
(2) Date: Aug. 3, 2018

(87) PCT Pub. No.: WO2017/215540
PCT Pub. Date: Dec. 21, 2017

(65) Prior Publication Data
US 2019/0042895 A1    Feb. 7, 2019

(30) Foreign Application Priority Data
Jun. 12, 2016    (CN) .......................... 2016 1 0410966

(51) Int. Cl.
*G06K 9/64*    (2006.01)
*G06K 9/00*    (2006.01)
(Continued)

(52) U.S. Cl.
CPC .......... *G06K 9/64* (2013.01); *G06K 9/00288* (2013.01); *G06K 9/46* (2013.01); *G06K 9/4628* (2013.01);
(Continued)

(58) Field of Classification Search
CPC .......... G06K 9/00315; G06K 9/00221; G06K 9/00248; G06K 9/00268; G06K 9/00302;
(Continued)

(56) References Cited

U.S. PATENT DOCUMENTS

2003/0103652 A1    6/2003    Lee et al.
2005/0238207 A1    10/2005   Tavares
2017/0083755 A1*   3/2017    Tang .................. G06K 9/00281

FOREIGN PATENT DOCUMENTS

CN    1794266 A      6/2006
CN    101388074 A    3/2009
(Continued)

OTHER PUBLICATIONS

First Office Action for Chinese Application No. 201610410966.1, dated Nov. 5, 2018.
(Continued)

*Primary Examiner* — Duy M Dang
(74) *Attorney, Agent, or Firm* — Wolf, Greenfield & Sacks, P.C.

(57) ABSTRACT

Provided are a method and a device for offline identity authentication. The method includes: acquiring two or more images for identity authentication to constitute a to-be-authenticated multivariate image group; extracting a concatenated PCA convolution feature of each of the images in the to-be-authenticated multivariate image group, to obtain feature vectors; fusing information on the images in the to-be-authenticated multivariate image group based on the feature vectors according to a score fusion strategy with a supervisory signal, to obtain a fusion vector; and inputting the fusion vector to a pre-trained SVM classifier to authenticate and determine whether the images in the to-be-authenticated multivariate image group are consistent with one another, to obtain an identity authentication result.

8 Claims, 7 Drawing Sheets

(51) Int. Cl.
*G06K 9/46* (2006.01)
*G06K 9/62* (2006.01)
*G06N 3/04* (2006.01)
*G06N 3/08* (2006.01)
*H04L 29/06* (2006.01)

(52) U.S. Cl.
CPC .......... *G06K 9/629* (2013.01); *G06K 9/6215* (2013.01); *G06K 9/6247* (2013.01); *G06K 9/6269* (2013.01); *G06K 9/6273* (2013.01); *G06K 9/6288* (2013.01); *G06N 3/04* (2013.01); *G06N 3/08* (2013.01); *H04L 63/0861* (2013.01)

(58) Field of Classification Search
CPC .. G06K 9/00335; G06K 9/00597; G06K 9/00; G06K 9/00979; G06K 9/64; G06Q 50/18; G06T 7/20
See application file for complete search history.

(56) References Cited

FOREIGN PATENT DOCUMENTS

| CN | 101510257 A | 8/2009 |
|---|---|---|
| CN | 102622588 A | 8/2012 |
| CN | 104123537 A | 10/2014 |
| CN | 105184235 A | 12/2015 |
| CN | 105447532 A | 3/2016 |
| CN | 105550657 A | 5/2016 |
| CN | 106127103 A | 11/2016 |

OTHER PUBLICATIONS

International Search Report dated Sep. 20, 2017 in connection with Application No. PCT/CN2017/087867.

Extended European Search Report for European Application No. 17812651.2, dated May 28, 2019.

Cameron Knowhow et al., Machine readable travel documents: Part 1: Machine readable passports, vol. 2: Specifications for electronically enabled passports with biometric identification capability. International Civil Aviation Organization, sixth edition, approved by the secretary general and published under his authority. 2006:131 pages.

Faruqe et al., Face recognition using PCA and SVM. IEEE Proceedings of the 3$^{rd}$ International Conference on Anti-Counterfeiting, Security, and Identification in Communication. 2009:97-101.

* cited by examiner

OFFLINE IDENTITY AUTHENTICATION METHOD AND APPARATUS

This Application is a national stage filing under 35 U.S.C. 371 of International Patent Application Serial No. PCT/CN2017/087867, filed Jun. 12, 2017, which claims priority to Chinese application number 201610410966.1, filed on Jun. 12, 2016. The entire contents of these applications are incorporated herein by reference in their entirety.

FIELD

The present disclosure relates to the field of pattern recognition, and in particular to a method and a device for offline identity authentication.

BACKGROUND

When authenticating an identity based on an ID card, both whether the ID card is genuine and whether a current user is a legal holder of the ID card are identified. Whether the ID card is genuine is determined using chip anti-counterfeiting technology based on whether the ID card is machine-read successfully by a card reader. The identity of the current user is checked and discriminated online in combination with an ID card system of the Ministry of Public Security, to further authenticate the identity. On the one hand, the online authentication method is performed only in a case where face database in the system of the Ministry of Public Security is permitted to be accessed, which limits application places. On the other hand, a fake ID card which has a genuine chip and a fake surface image cannot be automatically identified with the online authentication method. The fake ID card may be machine-read successfully, and the identity is authenticated to be genuine by online authentication. However, an image stored in the chip is not consistent with the surface image of the ID card. In this case, whether the chip image, the surface image of the ID card and a holder image of the ID card are consistent with one another is identified visually, to identify the fake ID card, which undoubtedly increases burden on a checker and even results in false detection or missed detection. In view of the problem, an intelligent authentication method is required, in which, offline authentication without relying on the face database of the Ministry of Public Security can be implemented, and whether the chip image, the surface image of the ID card and the holder image of the ID card are consistent with one another is identified simultaneously, to automatically provide an authentication result on whether the authentication is passed, thereby improving authentication efficiency.

SUMMARY

A method for offline identity authentication and a device for offline identity authentication are provided according to the embodiments of the present disclosure, to solve problems in the conventional technology that the face database of the Ministry of Public Security is relied on and it is difficult to identify whether a chip image, a surface image of the ID card and a holder image of the ID card are consistent with one another.

A method for offline identity authentication is provided according to an embodiment of the present disclosure, which includes: acquiring two or more images for identity authentication to constitute a to-be-authenticated multivariate image group; extracting a concatenated PCA convolution feature of each of the images in the to-be-authenticated multivariate image group, to obtain feature vectors; fusing information on the images in the to-be-authenticated multivariate image group based on the feature vectors according to a score fusion strategy with a supervisory signal, to obtain a fusion vector; and inputting the fusion vector to a pre-trained SVM classifier to authenticate and determine whether the images in the to-be-authenticated multivariate image group are consistent with one another, to obtain an identity authentication result.

Optionally, the multivariate image group is a ternary image group, and comprises a chip image of an ID card, a surface image of the ID card and a live face image.

Optionally, a SVM classifier is trained by the following steps: acquiring a chip image of an ID card, a surface image of the ID card and a live face image as samples to constitute a ternary sample group in a training set, where the ternary sample group in the training set includes positive samples and negative samples; extracting a concatenated PCA convolution feature of each of the images in the ternary sample group, to obtain sample feature vectors; fusing information on the images in the ternary sample group based on the sample feature vectors according to the score fusion strategy with the supervisory signal, to obtain a sample fusion vector; and inputting the sample fusion vector to the SVM classifier for training the SVM classifier, to obtain the pre-trained SVM classifier.

Optionally, the extracting the concatenated PCA convolution feature of each of the images in the to-be-authenticated ternary image group to obtain the feature vectors includes: inputting each of the images in the to-be-authenticated ternary image group into a pre-trained deep convolutional neural network; and selecting convolution outputs of N intermediate sub-layers of convolution groups in the deep convolutional neural network as concatenated layers, and sequentially performing PCA transform on the obtained concatenated layers layer by layer to output the feature vector, wherein N≥2.

Optionally, the deep convolutional neural network includes five convolution groups and two fully connected layers, and each of the convolution groups includes two convolution sub-layers and one pooling layer. The selecting convolution outputs of N intermediate sub-layers in the deep convolutional neural network as concatenated layers and sequentially performing PCA transform on the obtained concatenated layers layer by layer to output the feature vector includes: extracting an output of the pooling layer of a fourth convolution group, and stringing all values of the output into a first vector; performing PCA transform on the first vector and reserving a first number of principal components to obtain a first insertion vector; extracting an output of the pooling layer of a fifth convolution group, stringing all values of the output into a second vector, and inserting the first insertion vector into a header of the second vector; performing PCA transform on the inserted second vector, and reserving a second number of principal components to obtain a second insertion vector; extracting an output of a second fully connected layer as a third vector, and inserting the second insertion vector to a header of the third vector; and performing PCA transform on the inserted third vector, and reserving a third number of principal components to obtain the feature vector.

Optionally, the fusing information on the images in the to-be-authenticated ternary image group based on the feature vectors according to the score fusion strategy with the supervisory signal to obtain the fusion vector includes: calculating a cosine similarity degree between each pair of feature vectors of the three feature vectors corresponding to the to-be-authenticated ternary image group as three matching scores; calculating a difference between each of the matching scores and a preset empirical threshold corresponding to the matching score, as difference signals; encoding based on each of preset decision weights and the difference signal corresponding to the preset decision weight, to obtain weight signals, wherein the preset decision weights have a one-to-one correspondence with three pairs of the images in the to-be-authenticated ternary image group; and synthesizing the matching scores, the difference signals and the weight signals, as the fusion vector.

Optionally, the encoding based on each of the preset decision weights and the difference signal corresponding to the preset decision weight to obtain the weight signals includes: converting a ratio of the preset decision weights of three matching branches into an integer ratio, and normalizing each of integers in the integer ratio to a range from 0 to 7, wherein the three matching branches includes a matching branch between the chip image and the surface image, a matching branch between the chip image and the live face image, and a matching branch between the surface image and the live face image; converting the normalized integers in the integer ratio of the decision weights of the matching branches into binary codes, to obtain initial codes; and inserting a highest-order code corresponding to each of the difference signals into the initial code corresponding to the difference signal, to obtain the weight signals, where the highest-order code corresponding to the difference signal is one in a case where the difference signal is greater than zero, and the highest-order code corresponding to the difference signal is zero in a case where the difference signal is less than or equal to zero.

A device for offline identity authentication is provided according to an embodiment of the present disclosure, which includes a multivariate image acquiring module, a convolution feature extracting module, a score fusing module and an authenticating and determining module. The multivariate image acquiring module is configured to acquire two or more images for identity authentication to constitute a to-be-authenticated multivariate image group. The convolution feature extracting module is configured to extract a concatenated PCA convolution feature of each of the images in the to-be-authenticated multivariate image group, to obtain feature vectors. The score fusing module is configured to fuse information on the images in the to-be-authenticated multivariate image group based on the feature vectors according to a score fusion strategy with a supervisory signal, to obtain a fusion vector. The authenticating and determining module is configured to input the fusion vector into a pre-trained SVM classifier to authenticate and determine whether the images in the to-be-authenticated multivariate image group are consistent with one another, to obtain an identity authentication result.

Optionally, the multivariate image group is ternary image group, and includes a chip image of an ID card, a surface image of the ID card and a live face image.

Optionally, the score fusing module includes a matching score calculating unit, a difference signal calculating unit, a weight signal calculating unit and a fusion vector synthesizing unit. The matching score calculating unit is configured to calculate a cosine similarity degree of each pair of feature vectors of the three feature vectors corresponding to the to-be-authenticated ternary image group, as three matching scores. The difference signal calculating unit is configured to calculate a difference between each of the matching scores and a preset empirical threshold corresponding to the matching score as difference signals. The weight signal calculating unit is configured to encode based on each of preset decision weights and the difference signal corresponding to the preset decision weight, to obtain weight signals, where the preset decision weights have a one-to-one correspondence with three pairs of the images in the to-be-authenticated ternary image group. The fusion vector synthesizing unit is configured to synthesize the matching scores, the difference signals and the weight signals, as a fusion vector.

It may be seen from the above technical solutions that the embodiments of the present disclosure have the following advantages.

In the embodiments of the present disclosure, two or more images for identity authentication are acquired to constitute a to-be-authenticated multivariate image group. A concatenated PCA convolution feature of each of the images in the to-be-authenticated multivariate image group is extracted to obtain feature vectors. Information on the images in the to-be-authenticated multivariate image group is fused based on the feature vectors according to a score fusion strategy with a supervisory signal, to obtain a fusion vector. The fusion vector is inputted into a pre-trained SVM classifier to authenticate and determine whether the images in the to-be-authenticated multivariate image group are consistent with one another, to obtain an identity authentication result. In the embodiments of the present disclosure, a chip image, a surface image of a certificate such as an ID card and a live face image can be compared offline from an overall decision, and an authentication result can be provided based on a single decision of the pre-trained SVM classifier, thereby reducing burden on the checker and improving authentication efficiency without relying on face database of the Ministry of Public Security.

DETAILED DESCRIPTION OF EMBODIMENTS

The problems in the conventional technology that the face database of the Ministry of Public Security is relied on and it is difficult to identify whether the chip image, the surface image of an ID card and a holder image are consistent with one another are solved.

In order to make an objective, features and advantages of the present disclosure clearer and easier to be understood, the technical solutions according to the embodiments of the present disclosure are described clearly and completely below in conjunction with the drawings in the embodiments of the present disclosure. It is apparent that the embodiments described below are merely a part of the embodiments of the present disclosure, rather than all the embodiments of the present disclosure. All other embodiments obtained by those skilled in the art based on the embodiments of the present disclosure without any creative work fall within the protection scope of the present disclosure.

Figure 1:
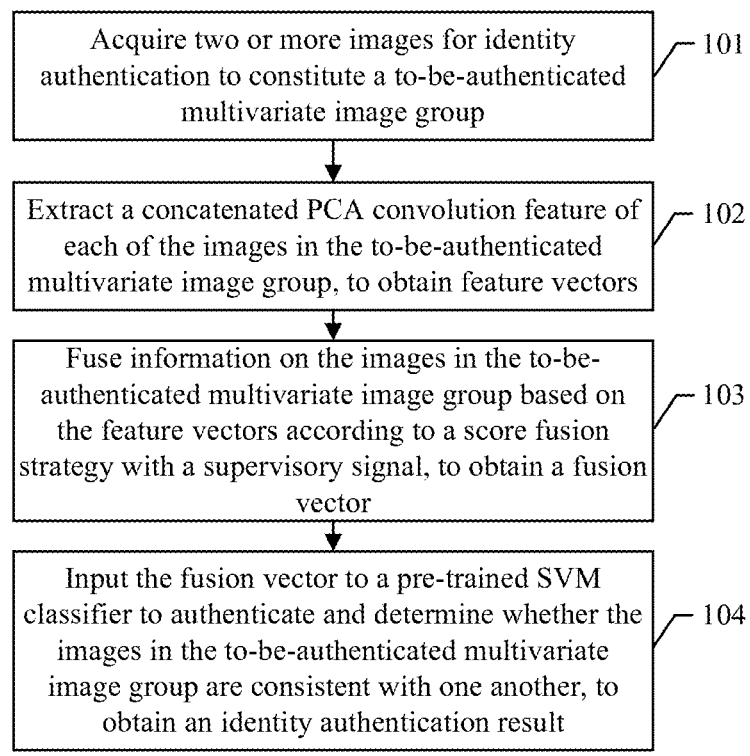
FIG. 1 is a flowchart of a method for offline identity authentication according to an embodiment of the present disclosure.

Referring to FIG. 1, a method for offline identity authentication according to an embodiment of the present disclosure includes steps 101 to 104.

In step 101, two or more images for identity authentication are acquired to constitute a to-be-authenticated multivariate image group.

The two images for identity authentication may include, for example, a chip image of an ID card and a surface image of the ID card, or may include the chip image of the ID card and a live face image.

In step 102, a concatenated PCA convolution feature of each of the images in the to-be-authenticated multivariate image group is extracted to obtain feature vectors.

After the to-be-authenticated multivariate image group is constituted, the concatenated principal component analysis (PCA) convolution feature of each of the images in the to-be-authenticated multivariate image group may be extracted, to obtain the feature vectors.

In step 103, information on the images in the to-be-authenticated multivariate image group is fused based on the feature vectors according to a score fusion strategy with a supervisory signal to obtain a fusion vector.

After the feature vectors are obtained, the information on the images in the to-be-authenticated multivariate image group may be fused based on the feature vectors according to the score fusion strategy with the supervisory signal, to obtain the fusion vector.

In step 104, the fusion vector is inputted into a pre-trained SVM classifier to authenticate and determine whether the images in the to-be-authenticated multivariate image group are consistent with one another, to obtain an identity authentication result.

After the fusion vector is obtained, the fusion vector may be inputted to the pre-trained SVM classifier to authenticate and determine whether the images in the to-be-authenticated multivariate image group are consistent with another other, to obtain the identity authentication result. For example, in a case where the multivariate image group includes the chip image of the ID card and the surface image of the ID card, whether the chip image is consistent with the surface image is authenticated and determined.

In the embodiment, two or more images for identity authentication are acquired to constitute the to-be-authenticated multivariate image group. A concatenated PCA convolution feature of each of the images in the to-be-authenticated multivariate image group is extracted to obtain feature vectors. Information on the images in the to-be-authenticated multivariate image group is fused based on the feature vectors according to the score fusion strategy with the supervisory signal, to obtain a fusion vector. The fusion vector is inputted into the pre-trained SVM classifier to authenticate and determine whether the images in the to-be-authenticated multivariate image group are consistent with one another, to obtain an identity authentication result. In the embodiment, the images for identity authentication can be compared offline from an overall decision, and an authentication result may be provided based on a single decision of the pre-trained SVM classifier, thereby reducing burden on the checker and improving the authentication efficiency without relying on the face database of the Ministry of Public Security.

Figure 2:
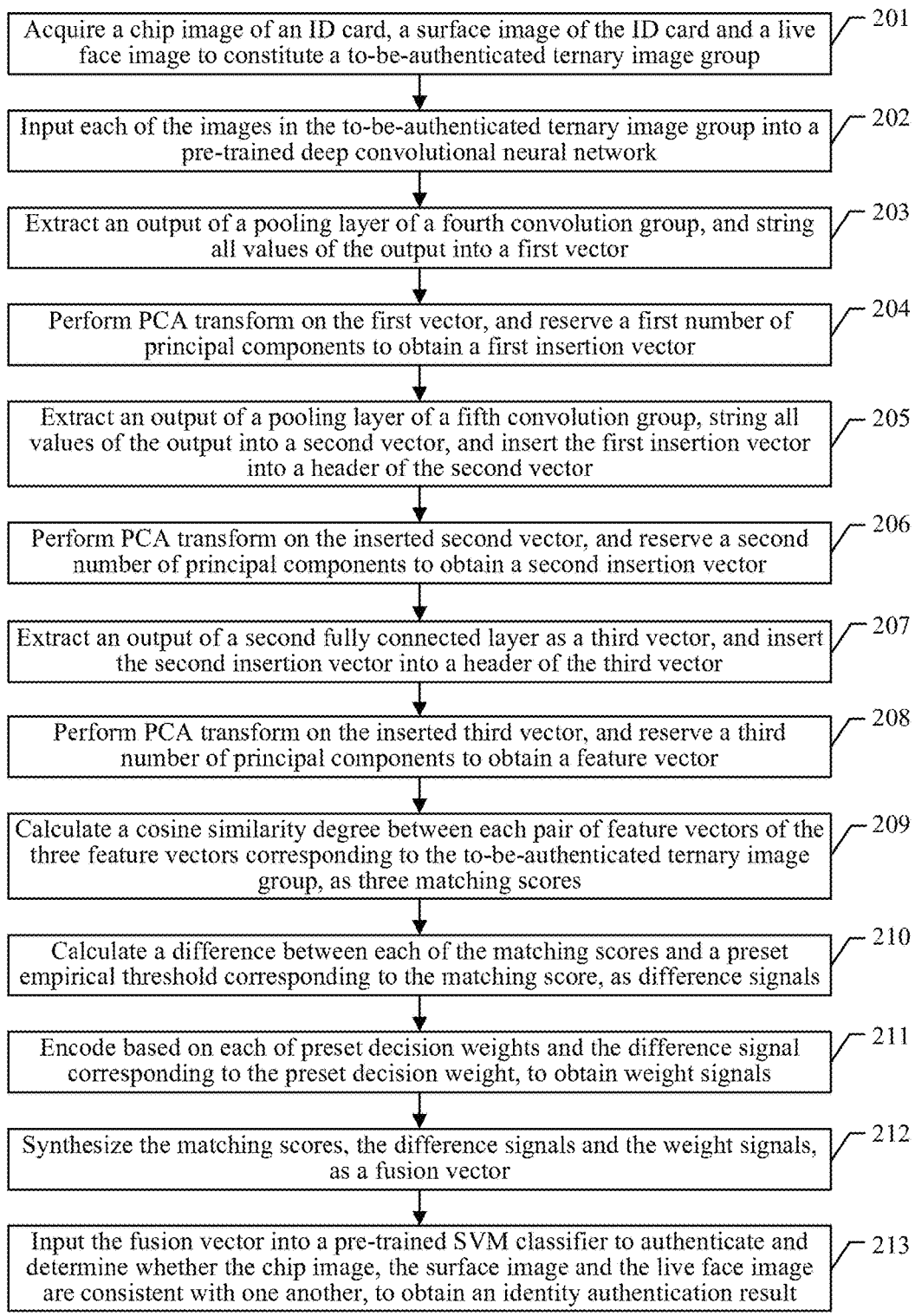
FIG. 2 is a flowchart of a method for offline identity authentication according to another embodiment of the present disclosure.

For ease of understanding, a method for offline identity authentication according to an embodiment of the present disclosure is described in detail below. Referring to FIG. 2, a method for offline identity authentication (with taking authentication for an image of an ID card as an example) according to another embodiment of the present disclosure includes steps 201 to 213.

In step 201, a chip image of an ID card, a surface image of the ID card and a live face image are acquired to constitute a to-be-authenticated ternary image group.

The chip image of the ID card, the surface image of the ID card and the live face image may be acquired to constitute a to-be-authenticated ternary image group. The chip image may be directly read by a card reading device. The surface image of the ID card may be obtained by a scanning device. The live face image may be obtained by a camera device. A face region in the acquired image may be detected by a face detector.

It should be illustrated that, in the embodiment, three images constitutes a multivariate image group, that is, a ternary image group including the chip image of the ID card, the surface image of the ID card and the live face image, and identity authentication based on a chip of the ID card may be performed using the ternary image group. In a case where the chip image, the surface image and the live face image are determined to be consistent with one another, the identity authentication is passed.

In step 202, each of the images in the to-be-authenticated ternary image group is inputted into a pre-trained deep convolutional neural network.

Figure 4:
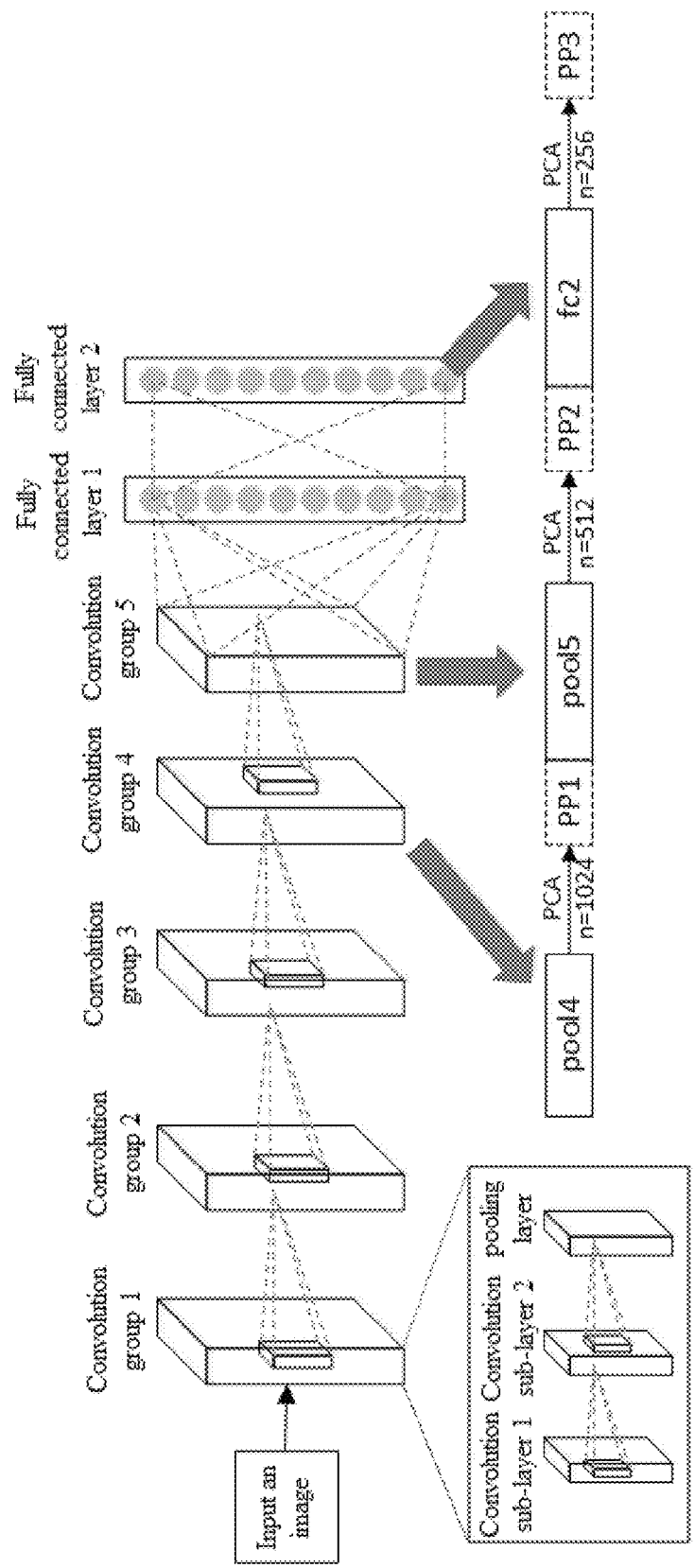
FIG. 4 is a schematic principle diagram of a deep convolutional neural network model and concatenated PCA convolution according to an embodiment of the present disclosure.

After the to-be-authenticated ternary image group is acquired, each of the images in the to-be-authenticated ternary image group may be inputted into a pre-trained deep convolutional neural network. As shown in FIG. 4, the deep convolutional neural network includes several convolution groups and several fully connected layers. Each of convolution groups includes several convolution sub-layers and one pooling layer. In order to output a reasonable feature vector, the deep convolutional neural network includes five convolution groups and two fully connected layers in the embodiment. When extracting the convolution feature, outputs (pool4 and pool5 as shown in FIG. 4) of pooling layers of the last two convolution groups of the five convolution groups and an output (fc2 as shown in FIG. 4) of the last fully connected layer are extracted, and PCA transform is performed on the outputs layer by layer to reserve a principal component of the output of each layer.

After the image is inputted into the deep convolutional neural network, convolution outputs of N (N≥2) intermediate sub-layers are selected in the deep convolutional neural network as concatenated layers, and PCA transform is performed on the obtained concatenated layers sequentially layer by layer to output a feature vector, which is described in detail with steps 203 to 208.

In step 203, an output of a pooling layer of a fourth convolution group is extracted, and all values of the output are strung into a first vector.

As shown in FIG. 4, after each of the images in the to-be-authenticated ternary image group is inputted into a pre-trained deep convolutional neural network, the output (pool4) of the pooling layer of the fourth convolution group may be extracted, and all values of the output are strung into a first vector.

In step 204, PCA transform is performed on the first vector, and a first number of principal components are reserved to obtain a first insertion vector.

After all values of the outputs are strung into the first vector, the PCA transform may be performed on the first vector, and a first number of principal components are reserved to obtain the first insertion vector (PP1). The first number may be set according to a specific situation, for example, the first number of principal components may be the first 1024 principal components.

In step 205, an output of a pooling layer of a fifth convolution group is extracted, all values of the output are strung into a second vector, and the first insertion vector is inserted into a header of the second vector.

As shown in FIG. 4, after a first number of principal components are reserved to obtain the first insertion vector, the output (pool5) of the pooling layer of the fifth convolution group may be extracted, all values of the output are strung into the second vector, and the first insertion vector is inserted into the header of the second vector.

In step 206, PCA transform is performed on the inserted second vector, and a second number of principal components are reserved to obtain a second insertion vector.

After the first insertion vector is inserted into the header of the second vector, PCA transform may be performed on the inserted second vector, and a second number of principal components may be reserved to obtain the second insertion vector (PP2). The second number may be set according to a specific situation, for example, the second number of principal components may be the first 512 principal components.

In step 207, an output of a second fully connected layer is extracted as a third vector, and the second insertion vector is inserted into a header of the third vector.

After the PCA transform is performed on the inserted second vector, and a second number of principal components are reserved to obtain the second insertion vector, the output of the second fully connected layer may be extracted as the third vector, and the second insertion vector is inserted into the header of the third vector (fc2).

In step 208, PCA transform is performed on the inserted third vector, and a third number of principal components are reserved to obtain a feature vector.

After the second insertion vector is inserted into the header of the third vector, the PCA transform may be performed on the inserted third vector, and a third number of principal components may be reserved to obtain the feature vector (PP3). The third number may be set according to a specific situation, for example, the third number of principal components may be the first 256 principal components.

It should be understood that, for the three images in the to-be-authenticated ternary image group, each of the images corresponds to one feature vector, and the ternary image group corresponds to three feature vectors.

In step 209, a cosine similarity degree between each pair of feature vectors of the three feature vectors corresponding to the to-be-authenticated ternary image group is calculated as three matching scores.

After the feature vectors are obtained, the cosine similarity degree between each pair of feature vectors of the three feature vectors corresponding to the to-be-authenticated ternary image group may be calculated as three matching scores. It should be understood that one cosine similarity degree (the cosine similarity degree may be used to evaluate a similarity degree between two feature vectors) may be calculated between each pair of feature vectors of the three feature vectors. Therefore, three cosine similarity degrees may be calculated by pairwise combination of the three feature vectors, and the cosine similarity degree is used as a matching score between the two feature vectors corresponding to the cosine similarity degree.

Specifically, the cosine similarity degree between two images ($I_1$, $I_2$) is calculated according to the following equation:

$$sim(I_1, I_2) = \frac{\sum_{k=1}^{n} f_{1k} f_{2k}}{\sqrt{\sum_{k=1}^{n} f_{1k}^2} \sqrt{\sum_{k=1}^{n} f_{2k}^2}}$$

where n denotes a dimension of a feature vector, $f_{1k}$ denotes a k-th element of the feature vector of $I_1$, and $f_{2k}$ denotes a k-th element of the feature vector of $I_2$. According to the equation, a matching score between the chip image and the surface image of the ID card is $s_1$, and a matching branch between the chip image and the surface image of the ID card is denoted as a branch p1. A matching score between the chip image and the live face image is $s_2$, and a matching branch between the chip image and the live face image is denoted as a branch p2. A matching score between the surface image of the ID card and the live face image is $s_3$, and a matching branch between the surface image of the ID card and the live face image is denoted as a branch p3.

In step 210, a difference between each of the matching scores and a preset empirical threshold corresponding to the matching score is calculated as difference signals.

After the three matching scores are calculated, a difference between each of matching score and a preset empirical threshold corresponding to the matching score may be calculated as difference signals.

It should be illustrated that the empirical threshold of each of the matching branches in a training sample set (see details in step 213) may be obtained using the 1:1 authentication algorithm, and the empirical threshold is calculated according to the following equation:

$$\underset{T}{\mathrm{argmax}} \frac{\sum_{i=1}^{m} \delta\{(s_i - T) \times y_i > 0\}}{\sum_{i=1}^{m} i}$$

where m denotes the number of sample pairs, $s_i$ denotes a similarity degree of an i-th sample pair, and $y_i$ is a class label of the i-th sample pair. In a case where the sample pair corresponds to the same person, the class label of the sample pair is 1. In a case where the sample pair corresponds to different persons, the class label of the sample pair is −1. $\delta\{\cdot\}$ denotes an indicator function and is defined as follows:

$$\delta\{x\} = \begin{cases} 1, & x \text{ is true} \\ 0, & x \text{ is false} \end{cases}.$$

The empirical thresholds $T_1$, $T_2$ and $T_3$ of the three matching branches are obtained.

In this step, the empirical threshold of each of the matching branches is subtracted from the matching score of the matching branch, to obtain difference signals of the three matching branches, which may be $d_1=s_1-T_1$, $d_2=s_2-T_2$ and $d_3=s_3-T_3$.

In step 211, encoding is performed based on each of preset decision weights and the difference signal corresponding to the preset decision weight, to obtain a weight signal.

After the difference signals are obtained, encoding may be performed based on each of the preset decision weights and the difference signal corresponding to the preset decision weight, to obtain the weight signals. The preset decision weights have a one-to-one correspondence with three pairs of images in the to-be-authenticated ternary image group. Specifically, step 211 includes the following steps (1) to (3).

In step (1), a ratio of the preset decision weights of the three matching branches is converted into an integer ratio, and an integer in the integer ratio is normalized to a range from 0 to 7, The three matching branches includes a matching branch between the chip image and the surface image of the ID card, a matching branch between the chip image and the live face image, and a matching branch between the surface image of the ID card and the live face image.

In step (2), the normalized integer in the integer ratio of the decision weights of the matching branches is converted into binary codes, to obtain initial codes.

In step (3), a highest-order code corresponding to each of the difference signals is inserted into the initial code corresponding to the difference signal, to obtain weight signals.

In a case where the difference signal is greater than zero, the highest-order code corresponding to the difference signal is one. In a case where the difference signal is less than or equal to zero, the highest-order code corresponding to the difference signal is zero.

For example, assuming that the ratio of the decision weights of the branch p1, the branch p2 and the branch p3 is 5:3:2, the ratio of the decision weights are encoded into 101, 011, and 010. In a case where the difference signal of the current branch p1 is positive, the highest-order bit of four bits for the branch p1 is 1, and the weight signal of the branch p1 is encoded into a binary code 1101, and the binary code are converted into a decimal number 13. Therefore, the weight signals $c_1$, $c_2$ and $c_3$ of all of the matching branches are obtained.

In step 212, the matching scores, the difference signals and the weight signals are synthesized as a fusion vector.

After the matching scores, the difference signals and the weight signals are obtained, the matching scores, the difference signals and the weight signals may be synthesized as the fusion vector. For example, in a specific application scenario, the synthesizing equation may be represented as:

$$x=[s_1,s_2,s_3,d_1,d_2,d_3,c_1,c_2,c_3]$$

In step 213, the fusion vector is inputted into a pre-trained SVM classifier to authenticate and determine whether the chip image, the surface image and the live face image are consistent with one another, to obtain an identity authentication result.

After the synthesized fusion vector is obtained, the fusion vector may be inputted into the pre-trained SVM classifier to authenticate and determine whether the chip image, the surface image and the live face image are consistent with one another, to obtain an identity authentication result.

It should be illustrated that a SVM classifier may be trained through the following steps A to D.

In step A, a chip image of an ID card, a surface image of the ID card and a live face image are acquired as samples to construct a ternary sample group in a training set. The ternary sample group in the training set includes positive samples and negative samples. For example, a ratio of the number of the positive samples to the number of the negative samples may be 1:1.

In step B, a concatenated PCA convolution feature of each of the images in the ternary sample group is extracted, to obtain sample feature vectors.

In step C, information on the images in the ternary sample group is fused based on the sample feature vectors according to the score fusion strategy with the supervisory signal, to obtain a sample fusion vector.

In step D, the sample fusion vector is inputted into the SVM classifier for training the SVM classifier, to obtain the pre-trained SVM classifier.

The above steps A, B, and C have the similar principle as the above-described steps 201 to 212, and are not described repeatedly herein anymore. It should be illustrated that the ternary sample group in the training set includes positive samples and negative samples. For example, a ratio of the number of the positive samples to the number of the negative samples may be 1:1. Three images in the triple sample group as positive samples correspond to the same identity. That is, an authentication result of the SVM classifier for the positive samples is that the authentication is passed, and an output result of the SVM classifier is 1. Three images in the triple sample group as negative samples correspond to different identities, an authentication result of the SVM classifier for the negative samples is that the authentication is not passed, and an output result of the SVM classifier is −1. For the negative samples, the three images correspond to different identities as long as any one of the three images is inconsistent with another image of the three images. Therefore, there are many types of combination variation for negative samples. In order to reduce redundancy of a sample space, negative samples may be determined in the following ways. A ternary sample group in which two of the chip image, the surface image and the live face image correspond to the same identity, and the other image than the two images correspond to a different identity from the two images is selected as negative samples. It should be understood that in a case where the three images correspond to identities different from one another, the three images may be determined as negative samples in any one "2+1" mode. Therefore, the case where the three images correspond to identities different from one another may be not taken into account in constructing the sample space, thereby reducing redundancy of the sample space, and improving learning efficiency of the SVM classifier for the negative samples.

In addition, it should be understood that after the fusion vector is inputted into the pre-trained SVM classifier, an authentication result is provided by the SVM classifier. In a case where an output value of the SVM classifier is 1, it indicates that the three images correspond to the same identity and the identity authentication is passed. In a case where the output value of the SVM classifier is −1, it indicates the three images correspond to different identities and the identity authentication is not passed.

For ease of understanding, the method for offline identity authentication according to an embodiment of the present disclosure is described below through an application scenario with reference to the embodiment described in FIG. 2.

Figure 3:
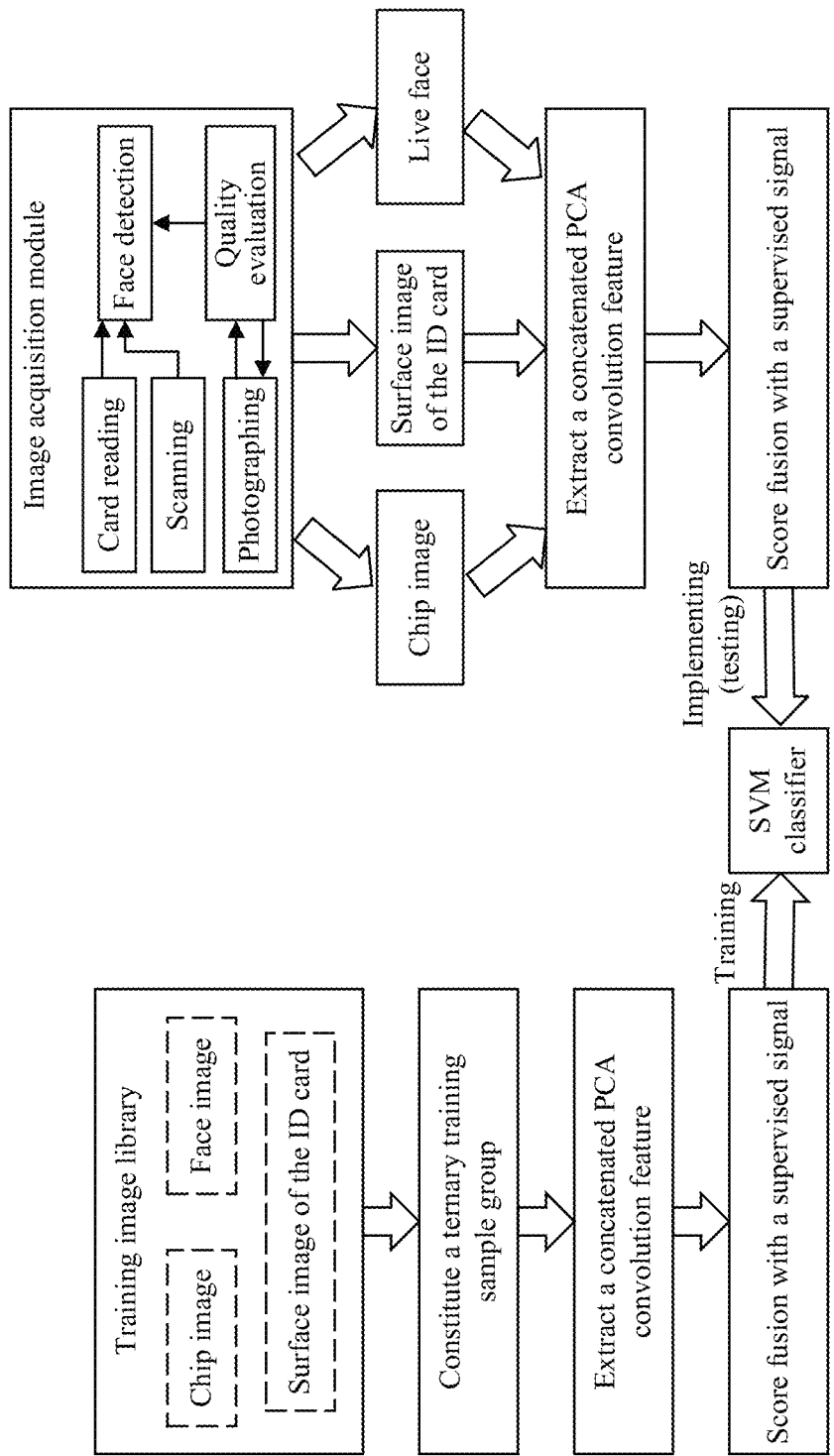
FIG. 3 is a schematic principle diagram of a method for offline identity authentication according to an embodiment of the present disclosure in an application scenario.

In the application scenario, a flow of the method for offline identity authentication is shown in FIG. 3, in which, the SVM classifier is used as a classification decider, and a training phase and an implementing (testing) phase are included.

In the training phase, samples are extracted from a training image library to constitute appropriate ternary positive and negative training samples. The training samples are inputted into the SVM classifier through a concatenated PCA convolution feature extracting module and a score fusing module with a supervisory signal for training the SVM classifier. When constituting the ternary positive and negative sample group, a combination of positive samples is fixed, that is, a ternary group including three images corresponding to the same identity is the combination of positive samples. There are many combination variations for the negative samples. In order to reduce redundancy of the sample space, the "2+1" mode is used, that is, a ternary group in which two of the three images correspond to the same identity and the other image than the two images corresponds to a different identity from the two images is selected as negative samples. The samples are constituted as follows. A class label of the positive samples is 1, and a class label of the negative samples is −1. The positive samples are a ternary group of the same person in which the three images correspond to the same identity feature and is represented as [⊕, ⊕, ⊕]. The negative samples are a ternary group in which at least one of the three images corresponds to a different identity from other images of the three images, and may be a combination such as [⊕, ⊕, ⊙], [⊕, ⊙, ⊕] and [⊙, ⊕, ⊕]. In a case where three images correspond to identities different from one another, the three images may be determined as negative samples in any one "2+1" mode. Therefore, the case may not be taken into account in constructing the sample space, thereby reducing redundancy of the sample space and improving learning efficiency of the classifier for negative samples.

In the implementing (testing) phase, three face images are acquired from the unified image acquisition module, and are input into the pre-trained SVM classifier through the concatenated PCA convolution feature extracting module and the score fusing module with the supervisory signal, to identify and authenticate the three face images. Since a feature extracting process and an information fusing process in the training phase are the same as those in the implementing (testing) phase, implementation of key technology of the method in the implementing phase are described below.

In the implementing (testing) phase, the image acquisition module outputs three face images, in which, a chip image may be directly obtained by a card reading device, a surface image of an ID card is obtained by a scanning device, and a live face image is obtained by a camera device. A face region in the acquired image is detected by a face detector. When acquiring the live face image, the acquired face image is screened and filtered using a quality evaluation algorithm, to ensure quality of the acquired image. In a case where the acquired image does not meet a quality requirement, an instruction may be automatically sent to instruct the holder to re-acquire a face image. Preprocessing operations such as face alignment and light correction are performed on the acquired image to obtain a final output of the acquisition module.

In the feature extracting phase, convolution outputs of multiple sub-layers are extracted in a pre-trained deep convolutional neural network model based on the deep learning algorithm, and PCA transform is performed layer by layer to obtain the concatenated PCA convolution feature. The operating principle is shown in FIG. 4. The pre-trained deep convolutional neural network includes five convolution groups and two fully connected layers. Each of the convolution groups includes two convolution sub-layers and one pooling layer. When extracting the convolution feature, outputs (pool4, pool5) of the pooling layers of the last two convolution groups and an output (fc2) of the last fully connected layer are extracted, and PCA transform is performed layer by layer to reserve a principal component of the output of each layer. The specific operation includes step (1) to (6) as follows.

In step (1), an output pool4 of the polling layer of a fourth convolution group is extracted, and all values of the output are strung into a vector.

In step (2), PCA transform is performed on the vector pool4, and the first $n_1$ (for example $n_1$=1024) principal components are reserved to obtain PP1.

In step (3), an output pool5 of the pooling layer of a fifth convolution group is extracted, and all values of the output are strung into a vector, and PP1 is inserted into a header of the vector.

In step (4), PCA transform is performed on the inserted vector pool5, and the first $n_2$ (for example, $n_2$=512) principal components are reserved to obtain PP2.

In step (5), an output fc2 of the second fully connected layer is extracted, and PP2 is inserted into a header of the vector.

In step (6), PCA transform is performed on the inserted vector fc2, and the first $n_3$ (for example, $n_3$=256) principal components are reserved to obtain PP3, which is a final extracted concatenated PCA convolution feature.

Figure 5:
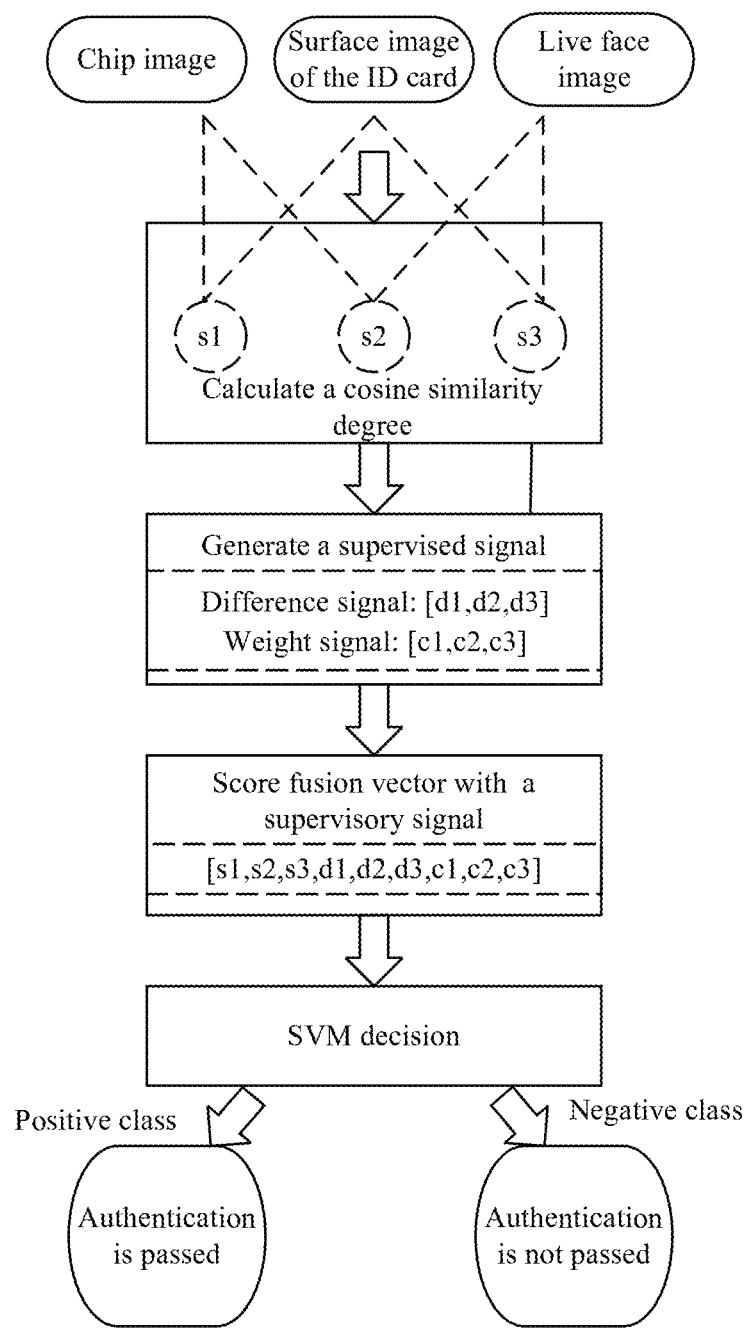
FIG. 5 is a schematic principle diagram of a score fusion strategy with a supervisory signal according to an embodiment of the present disclosure.

In a score fusing phase, a score fusion strategy with a supervisory signal is used. A basic principle of the score fusion strategy is to construct two supervisory signals including a difference signal and a weight signal based on a matching score, and to join encode the ternary image group based on the two supervisory signals in combination with the matching score. The difference signal refers to a difference between a matching score of each matching branch (a matching relationship between two images represents a matching branch) and an empirical threshold of the matching branch. The credibility of the matching score increases with the increase in the difference. The weight signal is obtained according to difference decision weights of the matching branches by encoding based on the decision weight and the matching score. In three-party authentication, environments in which the chip image is acquired and the surface image of the ID card is acquired are controllable, while image quality of the live face image subjects to many uncontrollable factors such as an attitude, light and shade. Therefore, in a process of joint comparison, the decision weight of the matching branch between the chip image and the surface image of the ID card may be large, while the decision weights of the other two matching branches are small. The operating principle of the score fusion strategy with the supervisory signal is shown in FIG. 5, and a specific implementation includes step (1) to (6) as follows.

In step (1), a concatenated PCA convolution feature of each of the chip image, the surface image of the ID card and the live face image is extracted based on the above process, and similarity between each pair of the images is measured based on a cosine similarity degree. The cosine similarity degree between two images ($I_1$, $I_2$) is calculated according to the following equation:

$$sim(I_1, I_2) = \frac{\sum_{k=1}^{n} f_{1k} f_{2k}}{\sqrt{\sum_{k=1}^{n} f_{1k}^2} \sqrt{\sum_{k=1}^{n} f_{2k}^2}}$$

where n denotes a dimension of the feature vector, $f_{1k}$ denotes a k-th element of the feature vector of $I_1$, and $f_{2k}$ denotes a k-th element of the feature vector of $I_2$. According to the equation, a matching score between the chip image and the surface image of the ID card is $s_1$, and a matching branch between the chip image and the surface image of the ID card is denoted as a branch p1. A matching score between the chip image and the live face image is $s_2$, and a matching branch between the chip image and the live face image is denoted as a branch p2. A matching score between the surface image of the ID card and the live face image is $s_3$, and a matching branch between the surface image of the ID card and the live face image is denoted as a branch p3;

In step (2), an empirical threshold of each of the matching branches in the training sample set is obtained using the 1:1 authentication algorithm, and the empirical threshold is calculated according to the following equation:

$$\underset{T}{\mathrm{argmax}} \frac{\sum_{i=1}^{m} \delta\{(s_i - T) \times y_i > 0\}}{\sum_{i=1}^{m} i}$$

where m denotes the number of sample pairs, $s_i$ denotes a similarity degree of an i-th sample pair, and $y_i$ is a class label of the i-th sample pair. In a case where the sample pair corresponds to the same person, the class label of the sample pair is 1. In a case where the sample pair corresponds to different persons, the class label of the sample pair is −1. $\delta\{\cdot\}$ denotes an indicator function and is defined as follows:

$$\delta\{x\} = \begin{cases} 1, & x \text{ is true} \\ 0, & x \text{ is false} \end{cases}.$$

The empirical thresholds $T_1$, $T_2$ and $T_3$ of the three matching branches are obtained;

In step (3), the difference signal is calculated. The empirical threshold of each of the matching branch is subtracted from the matching score of the matching branch, to obtain difference signals of the three matching branches, which are $d_1 = s_1 - T_1$, $d_2 = s_2 - T_2$ and $d_3 = s_3 - T_3$.

Figure 6:
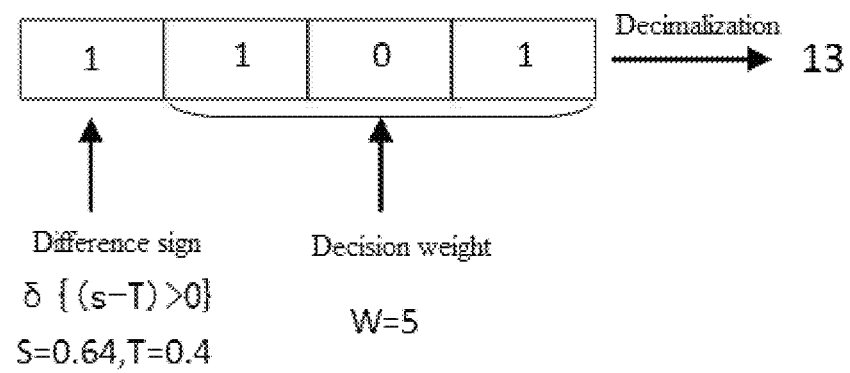
FIG. 6 is a schematic diagram showing encoding for a weight signal according to an embodiment of the present disclosure.

In step 4, the weight signal is calculated. The weight signal of each of the matching branches is represented with four bits. The highest-order bit in the four bits is encoded based on the difference signal and is determined according to $\delta\{(s-T)>0\}$. That is, the highest-order bit is encoded into 1 in a case of $s>T$, and the highest-order bit is encoded into 0 in a case of $s<T$. The three lower-order bits in the four bits are encoded based on the decision weight. The ratio of the decision weights of the three matching branches is converted into an integer ratio, and an integer in the integer ratio is normalized to a range from 0 to 7. The decision weight of each of the matching branches is encoded into three bits. For example, in a case where the ratio of the decision weights of the branch p1, the branch p2 and the branch p3 is 5:3:2, the decision weights are encoded into 101, 011, and 010 respectively. In a case where the difference signal of the branch p1 is positive, the highest-order bit of the four bits for the branch p1 is 1, and the weight signal of the branch p1 is encoded into binary codes 1101, and the binary codes are converted into a decimal number 13. FIG. 6 shows a schematic encoding diagram. Through the above operation, weight signals $c_1$, $c_2$ and $c_3$ of the matching branches are obtained.

In step 5, the matching scores, the difference signals and the weight signals are synthesized as a final score fusion vector $x=[s_1, s_2, s_3, d_1, d_2, d_3, c_1, c_2, c_3]$ with a supervisory signal.

In step 6, in a decision phase, after the concatenated PCA convolution features of the to-be-tested samples (the ternary group including the chip image, the surface image of the ID card, and the live face image which are acquired by the image acquisition module) are extracted based on the above process, and the fusion vector with a supervisory signal is generated based on the matching scores, a determination result is provided by the pre-trained SVM classifier automatically. In a case where the determination result is 1, it indicates that the three images correspond to the same identity and identity authentication is passed. In a case where the determination result is −1, it indicates that the three images correspond to different identities and identity authentication is not passed.

In summary, with the offline identity authentication algorithm in the present disclosure, whether a chip image of the ID card, a surface image of the ID card and a live face image are consistent with one another may be compared simultaneously offline, thereby effectively implementing three-party identity authentication based on the ID card, and especially effectively solving the problem of a fake ID card which has a genuine chip and a fake surface information. The three images are compared from an overall decision. Whether the authentication is passed or not is regarded as two classes to be decided, and a determination result for the consistency is provided using a classification algorithm, thereby avoiding a blurred decision caused by three times of pairwise comparison as well as a decision rule in which a decision priority level is set artificially. Specifically, the concatenated PCA convolution feature having strong robustness and generalization ability is provided based on the deep convolutional neural network, to describe features of the images. A score fusion strategy with a supervisory signal is provided in an information fusing phase, thereby enriching pattern expression of the fusion vector in a metric space, such that the classifier can fully learn a pattern mapping relationship of the ternary image group and provides an accurate determination result. As compared with the strategy in which a decision is made simply based on a threshold and the decision priority is set artificially, the score fusion strategy with the supervisory signal is more intelligent and reliable.

Figure 7:
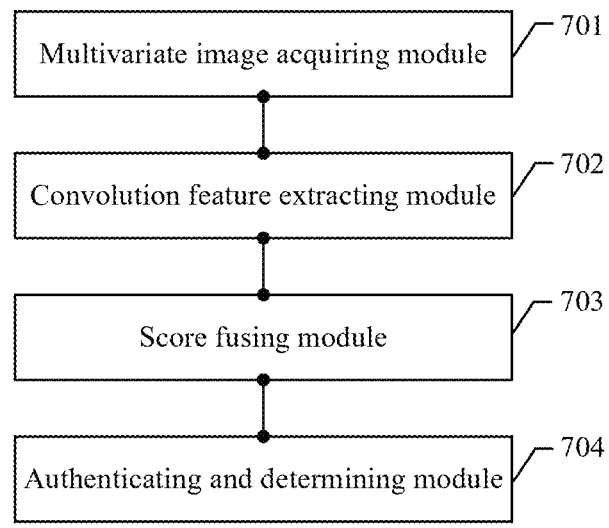
FIG. 7 is a structural diagram of a device for offline identity authentication according to an embodiment of the present disclosure.

The method for offline identity authentication is described above. A device for offline identity authentication is described below. Referring to FIG. 7, a device for offline identity authentication according to an embodiment of the present disclosure includes a multivariate image acquiring module 701, a convolution feature extracting module 702, a score fusing module 703 and an authenticating and determining module 704

The multivariate image acquiring module 701 is configured to acquire two or more images for identity authentication, to constitute a to-be-authenticated multivariate image group.

The convolution feature extracting module 702 is configured to extract a concatenated PCA convolution feature of each of the images in the to-be-authenticated multivariate image group, to obtain feature vectors.

The score fusing module 703 is configured to fuse information on the images in the to-be-authenticated multivariate image group based on the feature vectors according to a score fusion strategy with a supervisory signal, to obtain a fusion vector.

The authenticating and determining module 704 is configured to input the fusion vector into a pre-trained SVM classifier to authenticate and determine whether the chip image, the surface image and the live face image are consistent with one another, to obtain an identity authentication result.

In this embodiment, the multivariate image acquiring module 701 acquires two or more images for identity authentication to constitute a to-be-authenticated multivariate image group. The convolution feature extracting module 702 extracts a concatenated PCA convolution feature of each of the images in the to-be-authenticated multivariate image group to obtain feature vectors. The score fusing module 703 fuses information on the images in the to-be-authenticated multivariate image group based on the feature vectors according to a score fusion strategy with a supervisory signal, to obtain a fusion vector. The authenticating and determining module 704 inputs the fusion vector into a pre-trained SVM classifier to authenticate and determine whether the images in the to-be-authenticated multivariate image group are consistent with one another, to obtain an identity authentication result. In this embodiment, images for identity authentication are compared offline from an overall decision, and an authentication result is provided by a single decision of the pre-trained SVM classifier, thereby reducing burden on the checker and improving authentication efficiency without relying on face database of the Ministry of Public Security.

Figure 8:
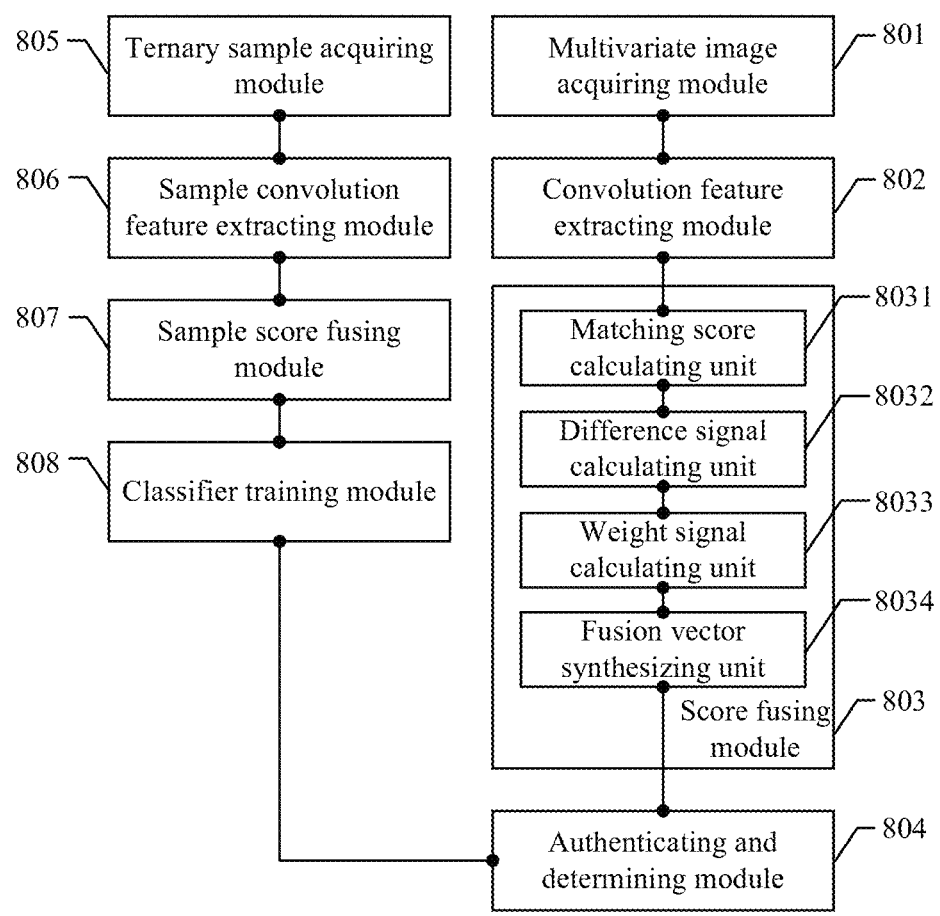
FIG. 8 is a structural diagram of a device for offline identity authentication according to another embodiment of the present disclosure.

For ease of understanding, a device for offline identity authentication according to an embodiment of the present disclosure is described in detail below. Referring to FIG. 8, a device for offline identity authentication according to another embodiment of the present disclosure includes a multivariate image acquiring module 801, a convolution feature extracting module 802, a score fusing module 803 and an authenticating and determining module 804.

The multivariate image acquiring module 801 is configured to acquire two or more images for identity authentication to constitute a to-be-authenticated multivariate image group.

The convolution feature extracting module 802 is configured to extract a concatenated PCA convolution feature of each of the images in the to-be-authenticated multivariate image group to obtain feature vectors.

The score fusing module 803 is configured to fuse information on the images in the to-be-authenticated multivariate image group based on the feature vectors according to a score fusion strategy with a supervisory signal, to obtain a fusion vector.

The authenticating and determining module 804 is configured to input the fusion vector into a pre-trained SVM classifier to authenticate and determine whether the images in the to-be-authenticated multivariate image group are consistent with one another, to obtain an identity authentication result.

In this embodiment, the multivariate image group may be a ternary image group, and include a chip image of an ID card, a surface image of the ID card and a live face image.

In this embodiment, a SVM classifier may be trained by a ternary sample acquiring module 805, a sample convolution feature extracting module 806, a sample score fusing module 807 and a classifier training module 808.

The ternary sample acquiring module 805 is configured to acquire a chip image of an ID card, a surface image of the ID card and a live face image as samples to constitute a ternary sample group in a training set. The ternary sample group in the training set includes positive samples and negative samples. For example, a ratio of the number of the positive samples to the number of the negative samples may be 1:1.

The sample convolution feature extracting module 806 is configured to extract a concatenated PCA convolution feature of each of the images in the ternary sample group to obtain sample feature vectors.

The sample score fusing module 807 is configured to fuse information on the images in the ternary sample group based on the sample feature vectors according to a score fusion strategy with a supervisory signal, to obtain a sample fusion vector.

The classifier training module 808 is configured to input the sample fusion vector to the SVM classifier for training the SVM classifier, to obtain the pre-trained SVM classifier.

In this embodiment, the score fusing module 803 includes a matching score calculating unit 8031, a difference signal calculating unit 8032, a weight signal calculating unit 8033 and a fusion vector synthesizing unit 8034.

The matching score calculating unit 8031 is configured to calculate a cosine similarity degree between each pair of feature vectors of the three feature vectors corresponding to the to-be-authenticated ternary image group, as three matching scores.

The difference signal calculating unit 8032 is configured to calculate a difference between each of the matching scores and a preset empirical threshold corresponding to the matching score, as difference signals.

The weight signal calculating unit 8033 is configured to encode based on each of preset decision weights and the difference signal corresponding to the preset decision weight, to obtain weight signals. The preset decision weights have a one-to-one correspondence with three pairs of images in the to-be-authenticated ternary image group.

The fusion vector synthesizing unit 8034 is configured to synthesize the matching scores, the difference signals and the weight signals, as a fusion vector.

It may be clearly understood by those skilled in the art that, for convenience and ease of description, operating processes of the system, the device and the unit described above may refer to the corresponding processes in the above method embodiments, which are not described repeatedly here anymore.

In several embodiments according to the present disclosure, it should be understood that the disclosed system, device and method can be implemented in other ways. The device embodiments described above are merely schematic. For example, the division of the units is merely a logic functional division, and there may be other divisions in practice. For example, multiple units or components may be combined, or may be integrated into another system, or some features may be ignored or not be executed. In addition, coupling, direct coupling or communication connection between components shown or discussed may be indirect coupling or communication connection via some interfaces, devices or units, which may be electrical, mechanical, or in other form.

The units illustrated as separate components may be or may not be separated physically, and the component displayed as a unit may be or may not be a physical unit. That is, the components may be located at the same place, or may be distributed on multiple network units. Some or all of the units may be selected as required to implement the objective of the solution of the embodiments.

In addition, all function units according to the embodiments of the present disclosure may be integrated into one processing unit, or may be each a separate unit physically, or two or more units are integrated into one unit. The integrated unit described above may be realized with hardware, or may be realized by a software function unit.

The integrated unit may be stored in a computer readable storage medium if the integrated unit is implemented in the form of a software function unit and is sold or used as a separate product. Base on such understanding, an essential part of the technical solution of the present disclosure, i.e., the part of the technical solution of the present disclosure that contributes to the conventional technology, or all or a part of the technical solution may be embodied in the form of a computer software product. The computer software product is stored in a storage medium, and includes several instructions to instructing a computer device (which may be a personal computer, a server, a network device or the like) to implement all or a part of steps of the method according to the embodiments of the present disclosure. The storage medium described above includes various mediums which can store program codes such as a USB disk, a mobile hard disk, a read-only memory (ROM), a random access memory (RAM), a magnetic disk and an optical disc.

In summary, the above embodiments are only described for illustrating the technical solutions of the present disclosure, and not for limiting the technical solutions. Although the present disclosure is illustrated in detail by referring to the aforementioned embodiments, it should be understood by those skilled in the art that modifications can be still made to the technical solutions recited in the aforementioned embodiments, or equivalent substitution can be made to a part of technical features of the technical solutions. The modification and equivalent substitution cannot make essence of the technical solutions depart from the spirit and a scope of the technical solutions according to the embodiments of the present disclosure.

The invention claimed is:

1. A method for offline identity authentication, comprising:
    acquiring two or more first images for identity authentication to constitute a to-be-authenticated multivariate image group, wherein the to-be-authenticated multivariate image comprises a first ternary image group;
    extracting a first concatenated principal component analysis (PCA) convolution feature of each of the first images in the to-be-authenticated multivariate image group, to obtain feature vectors corresponding to the to-be-authenticated multivariate image group;
    fusing information on the first images in the to-be-authenticated multivariate image group based on the feature vectors according to a score fusion strategy with a supervisory signal, to obtain a fusion vector;
    training a support-vector machine (SVM) classifier with a training set, to obtain a pre-trained SVM classifier, wherein the training set comprises second ternary sample groups, and the second ternary sample groups comprise positive samples and negative samples; and
    inputting the fusion vector to the pre-trained SVM classifier to authenticate and determine whether the images in the to-be-authenticated multivariate image group are consistent with one another, to obtain an identity authentication result;
    wherein fusing information on the first images in the to-be-authenticated multivariate image group based on the feature vectors according to the score fusion strategy with the supervisory signal to obtain the fusion vector comprises:
        calculating a cosine similarity degree between each pair among the feature vectors, to acquire matching scores;
        calculating a difference between each of the matching scores and a preset empirical threshold corresponding to each of matching scores, to acquire difference signals;
        encoding based on each of the difference signals and a preset decision weight corresponding to each of the difference signals, to acquire weight signals, wherein the preset decision weights have a one-to-one correspondence with pairs among the to-be-authenticated multivariate image group; and
        concatenating the matching scores, the difference signals and the weight signals, as the fusion vector.

2. The method according to claim 1, wherein the first ternary image group comprises a first chip image of a first ID card, a first surface image of the first ID card and a first live face image.

3. The method according to claim 2, wherein training the support-vector machine (SVM) classifier with the training set, to obtain the pre-trained SVM classifier comprisess:
    acquiring second images to constitute the second ternary sample groups in the training set, wherein each of the second ternary sample groups comprises three images that are a second chip image of a second ID card, a second surface image of the second ID card and the second live face image, the three images in each of the positive samples correspond to a same identity, and the three images in each of negative samples correspond to different identities;
    extracting a second concatenated PCA convolution feature of each of the second images in the second ternary sample group, to obtain sample feature vectors;
    fusing information on the second images in the second ternary sample groups based on the sample feature vectors according to the score fusion strategy with the supervisory signal, to obtain a sample fusion vector; and
    inputting the sample fusion vector to the SVM classifier for training the SVM classifier, to obtain the pre-trained SVM classifier.

4. The method according to claim 2, wherein the extracting the concatenated PCA convolution feature of each of the images in the to-be-authenticated ternary image group to obtain the feature vectors comprises:
    inputting each of the images in the to-be-authenticated ternary image group to a pre-trained deep convolutional neural network; and
    selecting convolution outputs of N intermediate sub-layers of convolution groups in the deep convolutional neural network, as concatenated layers, and sequentially performing PCA transform on the obtained concatenated layers layer by layer to output the feature vector, wherein $N \geq 2$.

5. The method according to claim 4,
    wherein the deep convolutional neural network comprises five convolution groups and two fully connected layers, and each of the convolution groups comprises two convolution sub-layers and one pooling layer, and wherein the selecting convolution outputs of N intermediate sub-layers in the deep convolutional neural network as concatenated layers and sequentially performing PCA transform on the obtained concatenated layers layer by layer to output the feature vector comprises:

extracting an output of the pooling layer of a fourth convolution group, and stringing all values of the output into a first vector;

performing PCA transform on the first vector and reserving a first number of principal components to obtain a first insertion vector;

extracting an output of the pooling layer of a fifth convolution group, stringing all values of the output into a second vector, and inserting the first insertion vector into a header of the second vector;

performing PCA transform on the inserted second vector, and reserving a second number of principal components to obtain a second insertion vector;

extracting an output of a second fully connected layer as a third vector, and inserting the second insertion vector to a header of the third vector; and performing PCA transform on the inserted third vector, and reserving a third number of principal components to obtain the feature vector.

6. The method according to claim 1, wherein the encoding based on each of the preset decision weights and the difference signal corresponding to the preset decision weight to obtain the weight signals comprises:

converting a ratio of the preset decision weights of three matching branches into an integer ratio, and normalizing each of integers in the integer ratio to a range from 0 to 7, wherein the three matching branches comprise a matching branch between the chip image and the surface image, a matching branch between the chip image and the live face image, and a matching branch between the surface image and the live face image;

converting the normalized integers in the integer ratio of the decision weights of the matching branches into binary codes, to obtain initial codes; and inserting a highest-order code corresponding to each of the difference signals into the initial code corresponding to the difference signal, to obtain the weight signals, wherein the highest-order code corresponding to the difference signal is one in a case where the difference signal is greater than zero, and the highest-order code corresponding to the difference signal is zero in a case where the difference signal is less than or equal to zero.

7. A device for offline identity authentication, comprising:

a multivariate image acquiring module configured to acquire two or more first images for identity authentication to constitute a to-be-authenticated multivariate image group, wherein the to-be-authenticated multivariate image comprises a first ternary image group;

a convolution feature extracting module configured to extract a first concatenated principal component analysis (PCA) convolution feature of each of the first images in the to-be-authenticated multivariate image group, to obtain three feature vectors corresponding to the to-be-authenticated multivariate image group;

a score fusing module configured to fuse information on the first images in the to-be-authenticated multivariate image group based on the feature vectors according to a score fusion strategy with a supervisory signal, to obtain a fusion vector;

a training module configured to train a support-vector machine (SVM) classifier with a training set, to obtain a pre-trained SVM classifier, wherein the training set comprises second ternary sample groups, and the second ternary sample groups comprise positive samples and negative samples; and an authenticating and determining module configured to input the fusion vector into the pre-trained SVM classifier to authenticate and determine whether the images in the to-be-authenticated multivariate image group are consistent with one another, to obtain an identity authentication result;

wherein the score fusion module further comprises:

a matching score calculating unit configured to calculate a cosine similarity degree between each pair among the feature vectors, to acquire matching scores;

a difference signal calculating unit configured to calculate a difference between each of the matching scores and a preset empirical threshold corresponding to each of matching scores, to acquire difference signals;

a weight signal calculating unit configured to encode based on each of the difference signals and a preset decision weight corresponding to each of the difference signals, to acquire weight signals, wherein the preset decision weights have a one-to-one correspondence with pairs among the to-be-authenticated multivariate image group; and a fusion vector concatenating unit configured to concatenate the matching scores, the difference signals and the weight signals, as the fusion vector.

8. The device according to claim 7, wherein the first ternary image group comprises a first chip image of a first ID card, a first surface image of the first ID card and a first live face image.

* * * * *